(12) United States Patent
Claffy

(10) Patent No.: US 7,950,679 B2
(45) Date of Patent: May 31, 2011

(54) INSULATED FOOD TRAY WAGON

(76) Inventor: Joseph Claffy, Western Springs, IL (US)

( * ) Notice: Subject to any disclaimer, the term of this patent is extended or adjusted under 35 U.S.C. 154(b) by 954 days.

(21) Appl. No.: 11/767,630

(22) Filed: Jun. 25, 2007

(65) Prior Publication Data

US 2008/0315624 A1 Dec. 25, 2008

(51) Int. Cl.
*B62B 3/00* (2006.01)
(52) U.S. Cl. .................................. 280/47.35; 280/79.2
(58) Field of Classification Search ............... 280/47.34, 280/47.35, 79.11, 79.2, 79.3; 165/42, 919, 165/918; 49/408, 449, 451
See application file for complete search history.

(56) References Cited

U.S. PATENT DOCUMENTS

| | | | |
|---|---|---|---|
| 2,636,227 A * | 4/1953 | Altwies | 49/451 |
| 3,275,393 A * | 9/1966 | Conklin et al. | 312/403 |
| 4,584,466 A | 4/1986 | de Mola | |
| 4,840,832 A * | 6/1989 | Weinle et al. | 428/156 |
| 4,936,377 A | 6/1990 | DeVogel et al. | |
| 5,069,273 A | 12/1991 | O'Hearne | |
| 5,182,438 A | 1/1993 | Oakes et al. | |
| 5,285,051 A | 2/1994 | DeGrow et al. | |
| 5,403,997 A | 4/1995 | Wimpee et al. | |
| 5,564,723 A | 10/1996 | Breeden et al. | |
| 5,910,210 A | 6/1999 | Violi | |
| 6,120,819 A | 9/2000 | Violi | |
| 6,344,630 B1 | 2/2002 | Jarvis et al. | |
| 6,672,601 B1 | 1/2004 | Hofheins et al. | |
| 6,676,141 B1 * | 1/2004 | Hadley | 280/47.35 |
| 6,684,657 B1 | 2/2004 | Dougherty | |
| 7,025,121 B2 | 4/2006 | Whitehead et al. | |
| 2003/0226657 A1 | 12/2003 | Wallace | |
| 2006/0055290 A1 | 3/2006 | Schalla | |

* cited by examiner

*Primary Examiner* — Frank B Vanaman
(74) *Attorney, Agent, or Firm* — Vedder Price PC

(57) ABSTRACT

An insulated food tray transportation wagon. The single-piece, low-weight, insulated food tray transportation wagon is equipped with sliding panels designed to wedge into place by either friction at any intermediate position to limit the need for an external locking mechanism or by using a step-based notched locking mechanism. The wagon also provides for a flat-panel geometry system, a thin, shell-molded casing made of flame-retardant material and shell insulation for reducing the weight of the wagon. The wagon is also equipped with a series of bottom drains, a kick plate and a series of top handles for maneuvering the wagon. The wagon is equipped with a flat, beverage-holding section located above the wagon, symmetrical handling devices for pulling and pushing the wagon from all sides, and alternatively, a sturdy pivoting hitch to connect a plurality of wagons for simultaneous transportation.

27 Claims, 8 Drawing Sheets

INSULATED FOOD TRAY WAGON

FIELD OF THE DISCLOSURE

The present disclosure relates generally to an insulated food tray transportation wagon and system of delivery of temperature-controlled meals, and in particular, to a wagon equipped with friction-based or step-based, self-locking doors; a low-mass, flame-retardant, double-walled shell casing; a series of bottom drains for liquid and solid waste; an optional kick plate and symmetrical top handles for maneuvering the wagon; a flat, beverage-holding section; an optional pivoting hitch for the transportation of multiple wagons and an associated notch hole; an improved symmetrical door system for easy access to insulated food trays and better temperature control; and an optimized food storage volume.

BACKGROUND

Food processing centers, such as kitchens, cafeterias, and other facilities, portion bulk food items into meals for human consumption. Meals are generally made of a combination of appetizers, entrées, sides, condiments, desserts, and beverages arranged on a single plate or tray that is divided into different compartments. The different food elements of a meal are often temperature controlled, portion controlled, and environmentally controlled to enhance the eating experience. These food elements have smells, consistencies, and methods of preparations that differ and often become stale or less enjoyable if the meal trays are shaken, rotated, or allowed to cool. In many cases, meals must be temperature controlled and delivered to a consumer within a fixed period of time, with a minimum of physical interference with the meal produced by the food processing center.

Numerous techniques are used to overcome these obstacles, such as local heating of selected food elements at a consumer station with microwaves or other convection ovens; the use of large eating areas located adjacent to the food processing center, as in the case of school cafeterias, to reduce transit times; the use of dried foods to be mixed with hot water obtained just prior to consumption; ultrared radiation heating; and the like. One solution of particular relevance to this disclosure is the use of a wagon having unique insulating properties to transport temperature-controlled meals from the food processing center to consumers.

One of the most extreme environments where wagons may be used, and one of the primary fields of use contemplated by this disclosure, is the use of insulated wagons in correctional facilities. While this disclosure focuses on correctional facilities, it is understood that any environment where temperature-controlled meals are served to large groups of individuals, such as hospitals, airliners, schools, convention centers, hotels, outdoor sports events, military mess halls, etc., are equally contemplated. Meals are often prepared and portioned in food trays by nonspecialized workers.

One possible type of food tray shown in this disclosure is a stackable, multicompartment insulated food tray. While one type of tray is shown, it is understood that any type of food tray is equally contemplated. Insulated food trays are stacked in a wagon and are often transported over long distances, across courtyards, through underground corridors, and through security posts prior to delivery to individuals housed in confined areas by nonspecialized workers. Wagons may need to be maneuvered through confined areas and gated checkpoints by operators. During delivery, operators must be able to access food trays with ease while not placing themselves in harm's way. In correctional environments, inmates may reach across fenced gates to grab elements on the wagon. Delivery agent, operator, and inmate safety during the delivery process is paramount. For this reason, wagons cannot include rough edges, detachable parts, and the doors must be offset from the outer edges of the wagon and composed of nonbreakable and nondetachable parts having locking options.

U.S. Pat. No. 6,672,601 issued to Hofheins et al. describes one model of correctional meal delivery cart with numerous disadvantages. This cart is equipped with sliding doors that must be locked with a hasp to prevent movement and may fall within reach of inmates during delivery operations. Operators must also carry some type of locking device, generally made of metal. What is needed is a new type of cart that allows the operator to close the inner volume without the use of detachable parts associated with a locking mechanism. Hofheins et al. also describes the use of thermally insulated doors and a shell casing made of high-impact polyethylene and rotating foam insulation. This foam insulation is highly compact and results in the enclosure being very heavy. The enclosure is placed over a heavy metal rail where a driving unit can be attached. The resulting cart is described having an empty weight of 1 to 2 tons, which causes serious maneuverability problems for a single operator during delivery operations. Hofheins et al. also does not take into account the possibility that flames may be used to degrade the enclosure and does not use recently improved materials to reduce the overall weight of the enclosure and chassis to improve maneuverability. Hofheins et al. also describes a wagon with an interior enclosure with bottom ridges oriented at a forward angle, which are meant to drain liquids away from the back portion of the enclosure toward the front of the wagon. The drain system in Hofheins et al. is complex, requires the use of uneven geometries created in the single-molded casing, and requires the creation of cuts or opening in the door portion. What is needed is an improved drainage system to adequately evacuate any fluid or small element from within the enclosure after spills or during cleaning.

Hofheins et al. also describes a device with small, oddly positioned push handles, which are located at waist height and work in tandem with an undercarriage driving engine to maneuver the heavy cart. What is needed is an easy-to-maneuver cart able to be transported by a single operator. Hofheins et al. also uses an angled top section for the enclosure to prevent any use of the upper section above the enclosure. What is needed is a wagon able to utilize this space to improve the meal delivery system. What is also needed is a lighter wagon equipped with adequate pushing and pulling elements to maneuver the wagon during operation even when loaded with insulating trays and meals and able to store or transport beverages, utensils, or other food elements to be provided along with the meals. What is also needed is the capacity to attach several wagons in a train configuration using a robust hitch system and where the doors are optimized to be used in a correctional environment.

SUMMARY

The present disclosure describes an insulated food tray transportation wagon primarily for use in correctional facility kitchen applications under extreme conditions of operation. The single-piece, low-weight, insulated food tray transportation wagon is equipped with sliding panels designed to wedge into place by either friction at any intermediate position to limit the need for an external locking mechanism or by using a step-based notched locking mechanism. The wagon also provides for a flat-panel geometry system to minimize heat transfer between the outside and the inside volume. The wagon also possesses a thin, shell-molded casing made of flame-retardant material and shell insulation for reducing the weight of the wagon to improve maneuverability and prevent damage from burning objects in contact with the wagon. The wagon is also equipped with a series of bottom drains made in the bottom portion of the enclosure to allow liquids and small objects such as food waste to evacuate after washing. In an alternate contemplated embodiment, the wagon includes a kick plate and a series of top handles for maneuvering the wagon with the feet and hands using a kick plate or a pulling mechanism, the top handles being placed judiciously above shoulder height to optimize the pushing capacity of an operator. The wagon is equipped with a flat, beverage-holding section located above the wagon, symmetrical handling devices for pulling and pushing the wagon from all sides, and alternatively, a sturdy pivoting hitch to connect a plurality of wagons for simultaneous transportation, all relating to a food storage volume optimally designed to hold tightly insulating food trays of a uniform size.

BRIEF DESCRIPTION OF THE DRAWINGS

The features of the present disclosure are believed to be novel and are set forth with particularity in the appended claims. The disclosure may best be understood by reference to the following description taken in conjunction with the accompanying drawings, and the figures that employ like reference numerals identify like elements.

DETAILED DESCRIPTION

The initial assignee of the subject matter of the present disclosure markets and offers for sale one possible commercial embodiment associated with this disclosure known as the CHUCKWAGON™ by Cortech Correctional Technologies, Inc.

Figure 1:
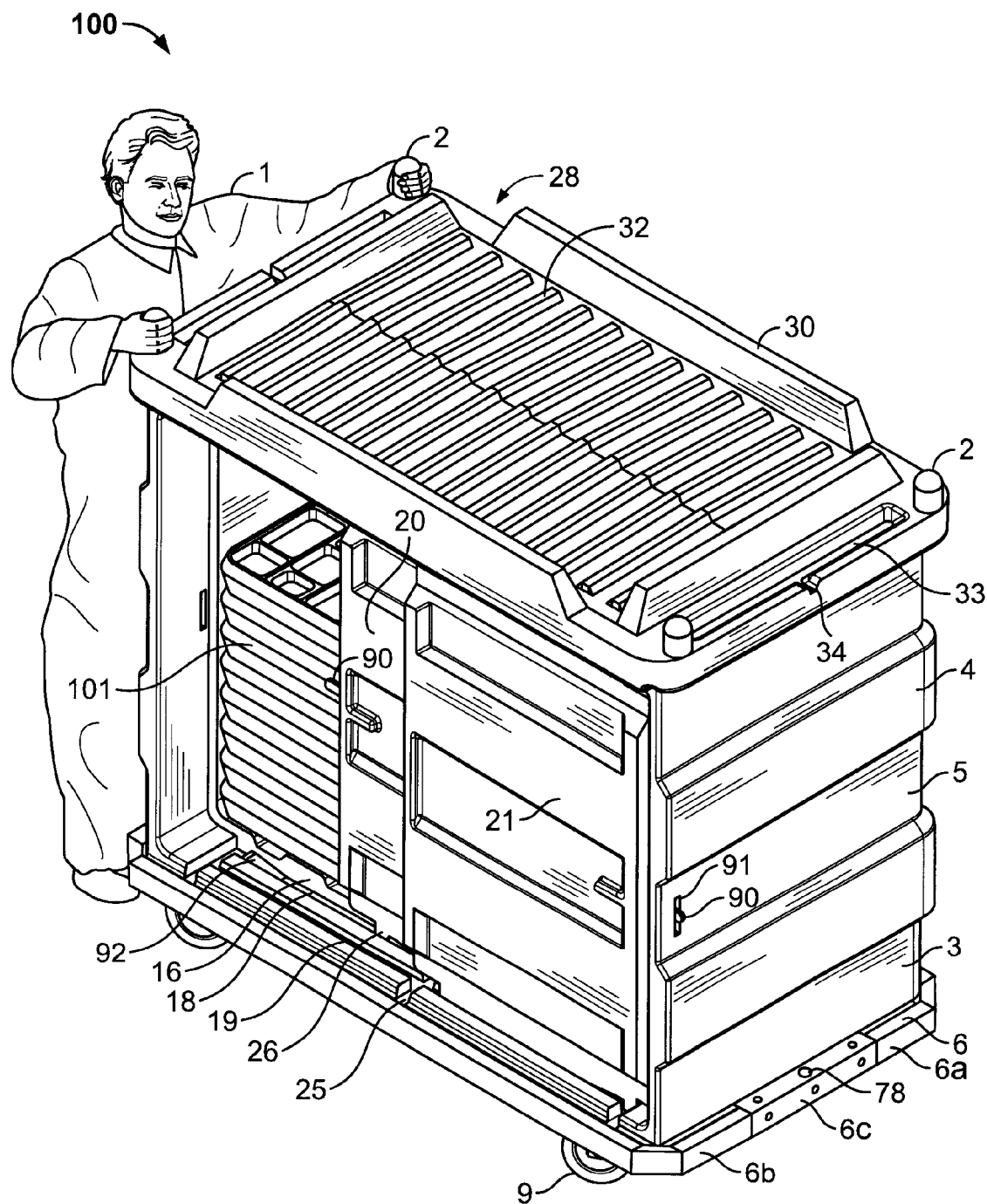
FIG. 1 is a perspective view of an insulated food tray transportation wagon according to an embodiment of the present invention where the wagon is shown with an operator holding the handling device during maneuvering.
Figure 2:
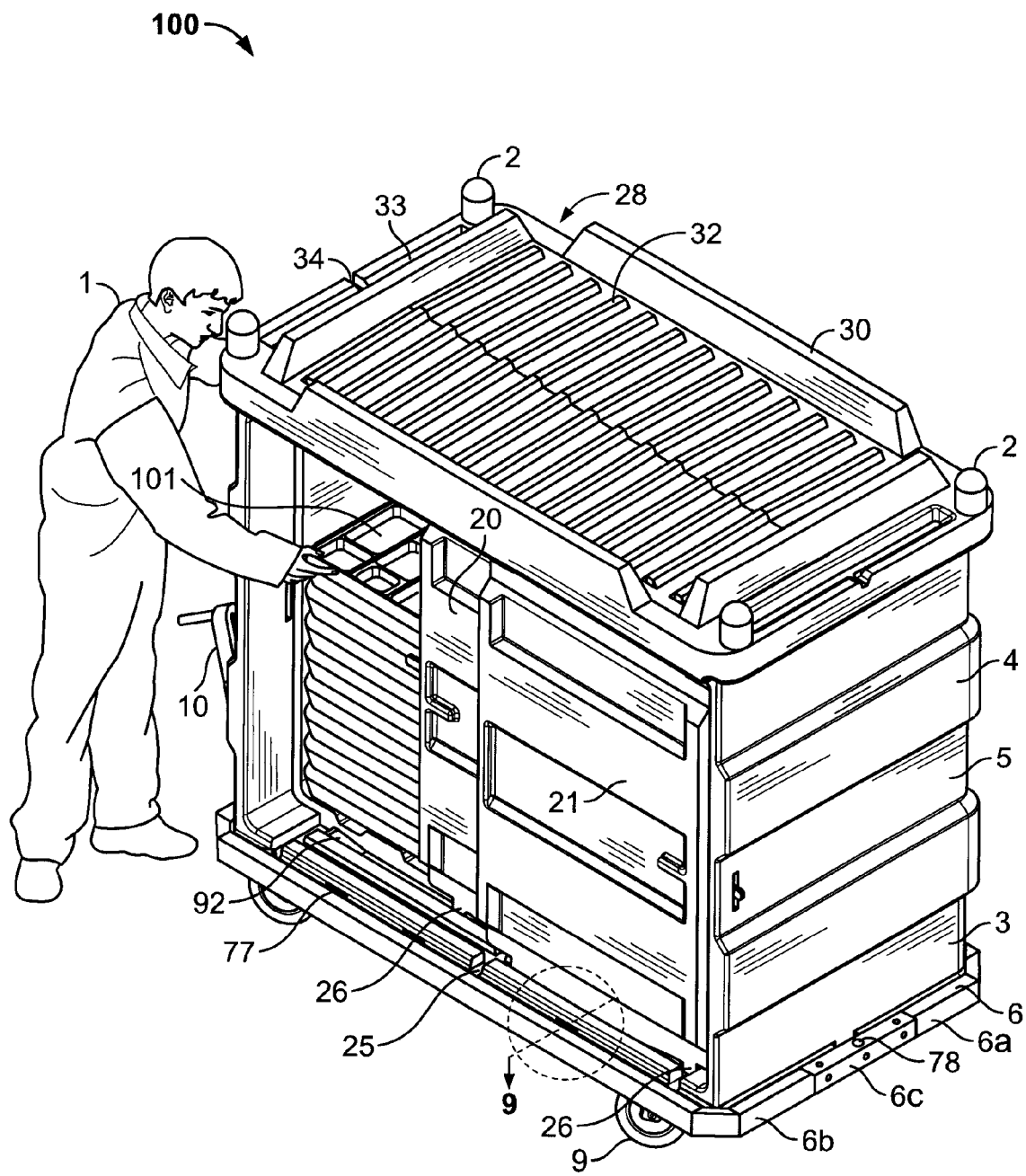
FIG. 2 is a perspective view of the insulated food tray transportation wagon as shown in FIG. 1 where the wagon is shown with an operator accessing the insulated food trays within the enclosed volume.

The current assignee of the subject matter of the present disclosure also markets food trays intended to be stored within the wagon shown in FIG. 1. These trays are sold under the trademarks ROCK-TRAYS™ and X TRAYS™. U.S. patent application Ser. No. 11/423,599, filed on Jun. 12, 2006, by the current assignee, relates to the new technology embodied by the X-TRAYS™ of Cortech Correctional Technologies, Inc. and is hereby fully incorporated herein by reference.

FIG. 1 shows a perspective view of an insulated food tray transportation wagon 100 according to a first embodiment of the present invention where the wagon 100 is shown with an operator 1 maneuvering the wagon 100 by pushing the top handles 2. The operator 1 can, in one alternate embodiment, also use kick plates 3 located on the bottom section of each side of the external surface 5 of the molded shell 4. While FIGS. 1-8 illustrate a first embodiment of the wagon 100 equipped with kick plates 3 and a pivoting hitch 10 used for additional movement capacities. what is also contemplated is a wagon 100 without a kick plate 3 or a pivoting hitch 10. One of ordinary skill in the art recognizes that different wagons 100 are contemplated where additional protection or plates are placed on the external surface 5 of the molded shell 4. What is also contemplated is the use of external pulling or moving devices attached by different structural elements linked to the external surface 5 of the molded shell 4 to add to the mobility of the wagon 100. In yet another embodiment, the external surface 5 of the molded shell 4 is pushed directly by the operator.

Figure 8:
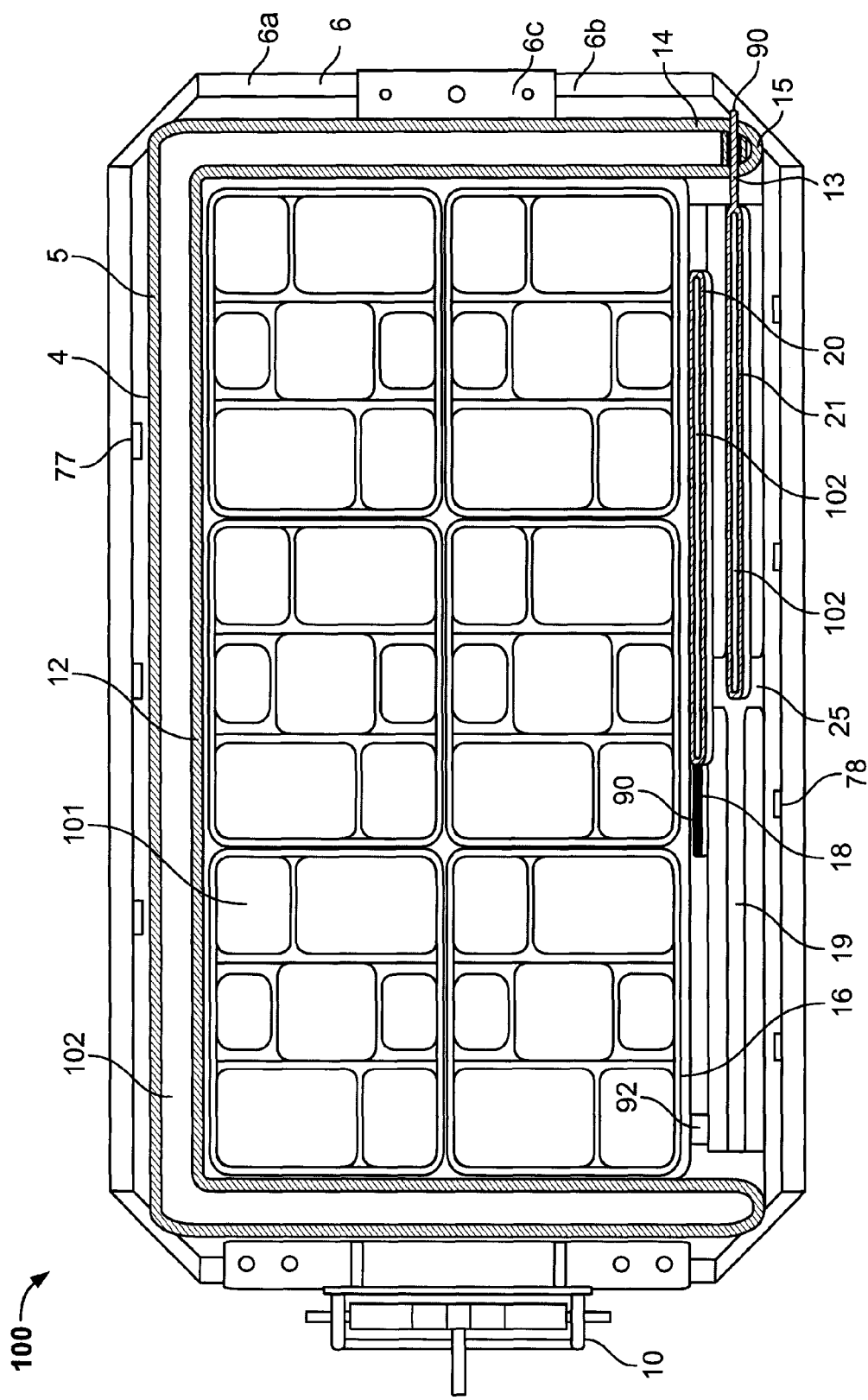
FIG. 8 is a top cut view along break lines 8-8 as shown in FIG. 5 illustrating a possible arrangement of insulated food trays within the enclosed volume.

The different elements of the molded shell 4 are best shown on the top sectional view of FIG. 8. The kick plates 3 are made of a stainless steel plate attached onto the external surface 5 of the molded shell 4 and designed to absorb shocks from the operator's kicks. In one embodiment, the kick plates 3 are secured during assembly of the base 6, but it is understood that any method of fixation of the kick plates 3 is contemplated, including but not limited to adhesion with glue to the wagon 100, the use of bolts and magnets, and insertion in sliding lock elements made in the external surface 5 of the molded shell 4. In one embodiment shown in FIG. 4, the base 6 is made of two U-shaped channels 6a, 6b with cross struts 8 for improved stability placed over and around an outside edge shaped in the external surface 5. The two U-shaped channels 6a and 6b are mechanically connected by a junction channel 6c. What is contemplated is the use of a closed metallic structure formed around the base 6 to provide additional stability to the wagon 100. In the embodiment shown in FIG. 4, struts 75 held by a fixation means 76 such as tamper-proof bolts are used to provide additional stability and strength. What is contemplated is the use of any type of steel of sufficient resistance to provide protection against any man-made shock or damage inflicted upon the wagon 100. In one embodiment, the steel is stainless steel gauge 10 and the twelve screws are stainless steel torx head tamperproof screws. This closed metallic structure may include ribs, recesses, or notches 7 to further reduce the weight of the molded shell 4.

Figure 4:
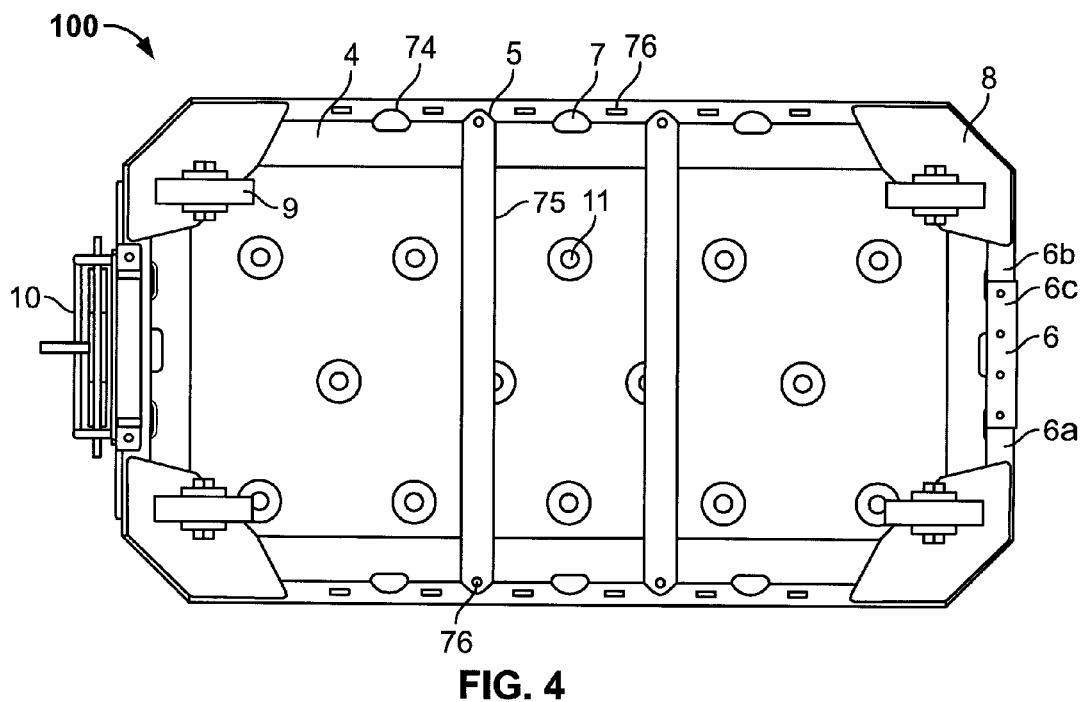
FIG. 4 is bottom view of the insulated food tray transportation wagon as shown in FIG. 1.
Figure 9:
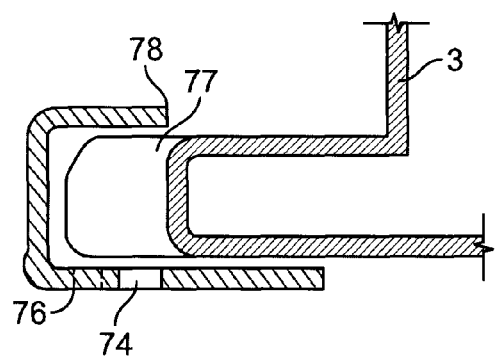
FIG. 9 is a close-up sectional view along break line 9 as shown in FIG. 2 illustrating an embodiment of the present disclosure.

FIG. 8 shows a cut-away view of the closed metallic structure placed above an outer ring of the molded shell 4. The molded shell 4 includes radial notches 78, 77 placed around the edge of the molded shell 4. The base 6 is locked into place around the molded shell 4 to allow for gaps and openings to allow for the evacuation of liquid and solid waste from within the wagon 100 to the floor. FIG. 9 illustrates a detailed sectional view of the U-shaped channel with a bottom aperture 74 and cut holes 76 located under the base 6 as shown in FIG. 4. What is contemplated is the use of oblong cut holes machined in the U-shaped channels using a laser cutter. While one type of hole-making technology is disclosed, what is contemplated is the use of any technology, including molding, forming, boring, etc. to allow for an opening and a communication between the upper surface of the U-shaped channels and the lower surface of the U-shaped channels. FIG. 4 shows a configuration where a handful of cut holes 76 and apertures 74 are made, but what is contemplated is the use of any quantity of apertures sufficient to allow for the proper evacuation of liquid and solid waste from the wagon 100 to the floor. What is also contemplated is the use of internal pipes and tubes molded within the molded shell 4. In addition, the closed metallic structure placed above an outer ring of the molded shell 4 is of greater radial size than the molded shell 4 on which it is placed in order to create a built-in shock absorber system. The wagon 100 upon hitting an obstacle is capable of absorbing shocks by moving the closed metallic structure over the molded shell 4. In one embodiment, a tolerance of up to 1 to 2 inches is contemplated.

FIG. 4 further illustrates the use of four wheels 9 attached to the base 6 on the corner struts 8. In one preferred embodiment, the pivoting hitch 10 is also attached to the base 6. While no detail is shown as to the method of fixation of the base 6 to the external surface 5, the hitch 10 to the base 6, or the wheels 9 to the base 6, what is contemplated is any method of permanent and impermanent fixation of these elements, including but not limited to welding, polymer adhesion, bolting, clipping, notching, sliding, or any other method of fixation suitable to these elements.

FIG. 4 also shows the use of small circular recesses 11 made, when possible, in the external surface 5 to further relieve weight of the wagon 100. While one type of recess 11 is shown and disclosed, what is contemplated is the use of any reasonable type of recess 11 or volume reduction technique to maintain the overall insulation capacity and mechanical strength of the molded shell 4 while alleviating the overall weight of the molded shell 4. In yet another embodiment, the U-shaped channels are made of 10 gauge stainless steel. FIG. 8 also shows one embodiment where the U-shaped channels are cut in the corners to limit the presence of sharp corners capable of damaging the feet of the operator 1 if the wagon 100 is suddenly rotated.

Figure 5:
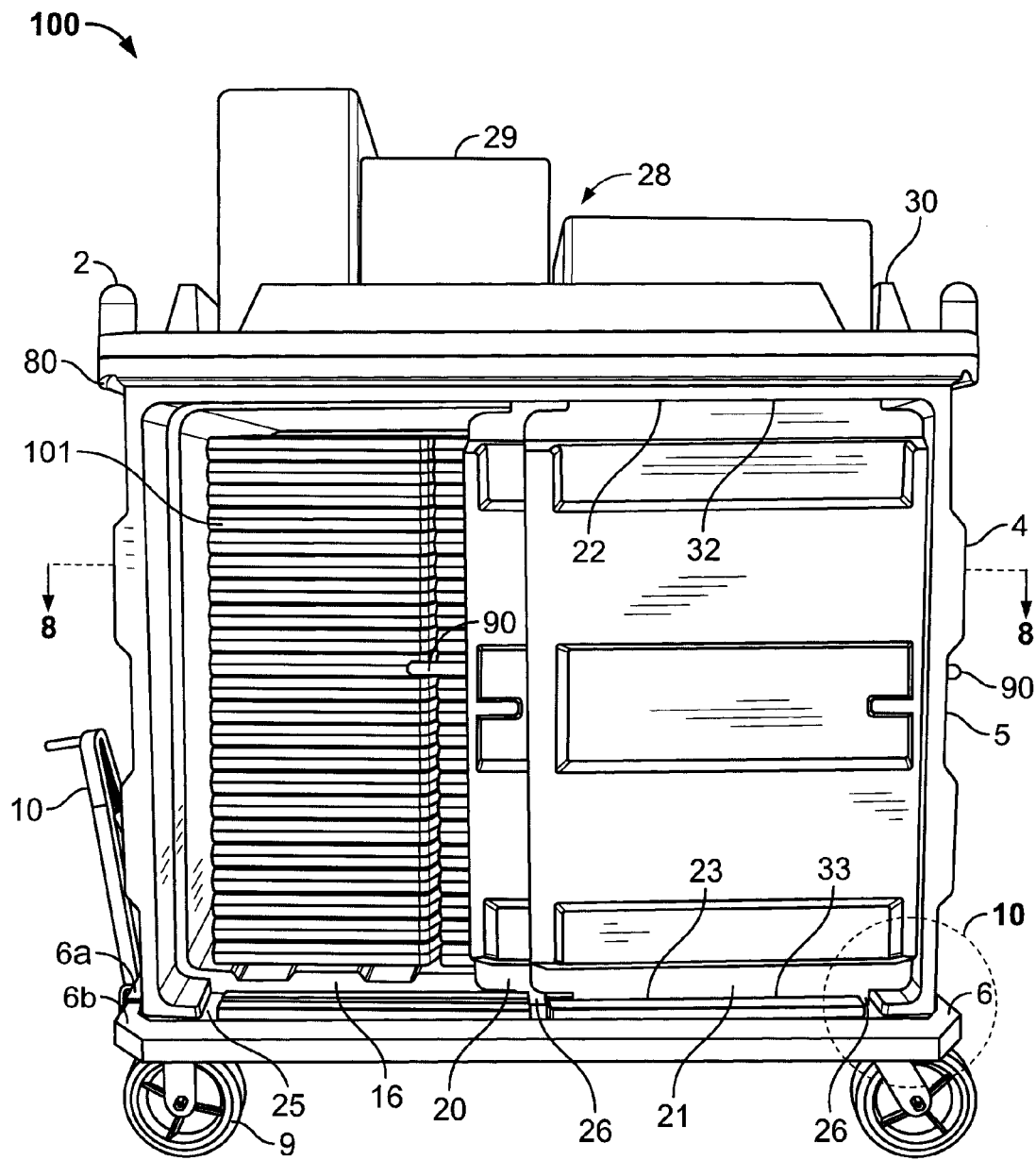
FIG. 5 is a perspective front view of the insulated food tray transportation wagon as shown in FIG. 1 with food items located in the upper area with one panel partly opened.

In one embodiment, the wagon 100 shown in FIGS. 1-8 is made of a dual-surface, molded shell 4. FIG. 8 best illustrates the cuboid-shaped internal surface 12 defined functionally as having a first rectangular opening 13, an external surface 5 having a second rectangular opening 14, and a junction surface 15 connecting the first rectangular opening 13 to the second rectangular opening 14 to form an enclosed volume 10 made of two walls where insulation can be inserted between both walls. In one embodiment, the cuboid-shaped internal surface 12 is designed as an internal food storage enclosure where trays 101 are stacked and stored. FIG. 5 best illustrates how food trays 101 may be stacked vertically from a flat floor surface 16 of the enclosed volume 10 to a flat top portion 17 of the enclosed volume 10. FIG. 8 shows a configuration where the trays 101 are stacked horizontally in two rows in width and three columns in length. FIG. 8 illustrates how the internal surface 12 may be designed of such dimension to accommodate trays 101 efficiently and without waste of space. What is contemplated in a first preferred embodiment is the stacking of 102 X-TRAYS™ within the enclosed volume 10 without lids. What is also contemplated is the stacking of 132 ROCK TRAYS™ within the enclosed volume 10 without lids. While two possible stacking configurations are specifically disclosed, one of ordinary skill in the art recognizes that the use of any possible geometry and size of the enclosed volume 10 in coordination with food trays of varied sizes is contemplated in order to optimize the quantity of trays to be transported. While one possible dual-surfaced molded shell 4 is shown and disclosed as a cuboid-shaped or a rectangular volume, what is contemplated is the use of any thin-walled surface used as part of a shell and able to enclose insulation 102. What is further contemplated is the use of ribs, surfaces, intermediate shells, support elements, beams, or any other mechanical structure within the molded shell 4 to create essentially an internal surface 12 and an external surface 5. FIG. 8 also shows that the junction surface 15 comprises a first groove 18 at a fixed distance from the first rectangular opening for holding a first panel 20, and a second groove 19 at a fixed distance from first groove 18 for holding a second panel 21. In one embodiment, the first groove 18 and the second groove 19 are located at the top and bottom portions of the junction surface 15 and connect with a top end 22 and a bottom end 23 of the panels 20, 21. While only part of the junction surface 15 is shown with grooves, what is contemplated is the use of any geometry of grooves able to hold the panels 20, 21 in place in a similar fashion. The dual-surface, molded shell 4 may further include an insulating foam (not shown) in the enclosed volume in contact with the internal surface 12. In one embodiment, the foam is a polyurethane foam made of a mixture of BASF® AUTOFROTH Resin and BASF AUTOFROTH® Isocyanate. In a preferred embodiment, the dual-surface, molded shell 4 is made of a blend of a flame-retardant, high-density polyethylene and a linear, low-density copolymer of 0.932 density having a melt index of 5. The molded shell 4 in a preferred embodiment is made of a custom compounded polyaxis copolymer consisting of halogenated bisphenol derivative, antinomy, and titanium oxide. In yet another preferred embodiment, the flame-retardant, high-density polyethylene and the low-density copolymer are approved by the Food and Drug Administration (FDA).

What is also contemplated is the use of any internal insulation that allows for the greatest temperature difference between the internal surface 12 and the external surface 5 while controlling the overall weight of the wagon 100, including but not limited to vacuum, air, gasses, liquids, solids, mousses, low-density plastics, powders, or any other suitable substitute. In one embodiment, the overall dimensions of the wagon 100 are approximately 32 inches wide by approximately 65 inches high and approximately 58 inches long. What is also contemplated is the use of a color code to distinguish between different generations of wagons 100 or between wagons with different protections, plating, or transportation capacities. In one embodiment, the color blue is used for a first model of wagon 100, in another embodiment, the color gray is used. What is contemplated is s wagon 100 where the internal surface 12 is capable of storing both bulk foods and drinks.

FIG. 1 shows a wagon with a frame 6 having at least three wheels 6 connected to the external surface, and in one preferred embodiment shown as FIG. 4, four wheels 6 connected to the external surface. In one embodiment, the front wheels are heavy duty King Pinless wheels to prevent breakage. The first panel 20 is slidably connected in the first groove 18 for sliding from an open position to a closed position, and the second panel 21 is slidably connected in the second groove 19 for sliding from an open position to a closed position. The panels 20, 21 and the external surface 5 are shown with localized ridges and grooves designed to rigidify and thicken the midsections of the wagon 100. These ridges can also serve alternatively to produce locally a handle, a support bar, or an edge to be used during manipulation of the panels 20, 21 and the wagon 100 for any purpose. It is understood by one of ordinary skill in the art of plastic molding and ribbing that different configurations are contemplated and disclosed herein. In a preferred embodiment, the panels 20, 21 are removed by centering them in the center of the opening, then lifting the panel by about 1 inch and pulling the bottom section of the panels 20, 21 at an angle. A plenum of 3 inches below the inside portion of the roof is contemplated in one embodiment.

In one embodiment, the sliding movement of the first panel 20 within the first groove 18 requires an outside force to overcome the frictional force between the first groove 18 and the first panel. One of ordinary skill in the art recognizes that frictional forces are created by calculating and designing tolerances in thickness between the first panel 20 and the first groove 18 so that the available gap between the first groove 18 and the first panel 20 is sufficiently small to endure a controlled level of friction between both surfaces. While one method of creating friction by rubbing is disclosed and shown, other methods are also contemplated including the use of different surface finishes, small angular variations between two surfaces. Use of flexible or soft surfaces and the like are also contemplated. In another embodiment, the frictional force is a result of the contact of the top end 22 and the bottom end 23 of the panel with the first groove 18. What is also contemplated is the use of a frictional force located between both panels 20, 21 as a result of a narrow gap between the first groove 18 and the second groove 19. While two possible locations where friction occurs are disclosed, what is contemplated is any method of displacement of panels resulting in the friction of the panels 20, 21 within the first and second grooves 18, 19.

Figure 10:
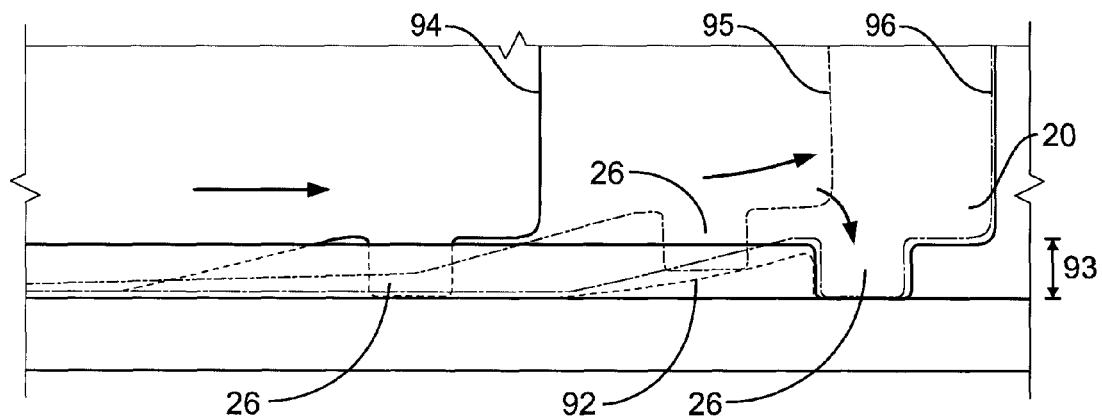
FIG. 10 is an animated close-up front view along the dashed line shown in FIG. 5 illustrating a possible embodiment of the closure system of the door according to an embodiment of the present disclosure.

In another embodiment illustrated in FIG. 10, the first panel 20 is held in the closed configuration shown as position 96 by the resistance of a first groove 26 after traveling over a step notch 92 from an initial open position 94 up the ramp 95 to the closed position. What is disclosed is a first panel 20 having a lock notch 26 at both a bottom end 23 and a top end 22 allowing the fist panel 20 to be used either upside up or downside up. What is also understood by one of ordinary skill in the art is the creation of a first panel 20 of smaller overall height than the first groove 18 to allow for lifting the first panel 20 during the intermediate step 95 up the step notch 92. The difference in height between the first groove 18 and the first panel 20 also allows the first panel 20 to be inserted in the first groove 18 by lift-and-push. In one embodiment, the first panel 20 is at least 1 inch smaller than the opening in which the first panel 20 is placed. What is also contemplated is the use of the above described technology for the second panel 21 placed in the second groove 19. What is also contemplated is the use of a lock plate 90 as shown on FIG. 1 that is molded within the first or second panel 20, 21 and creates a protrusion that can be slid into a lock aperture 91 in the molded shell 4.

Figure 6:
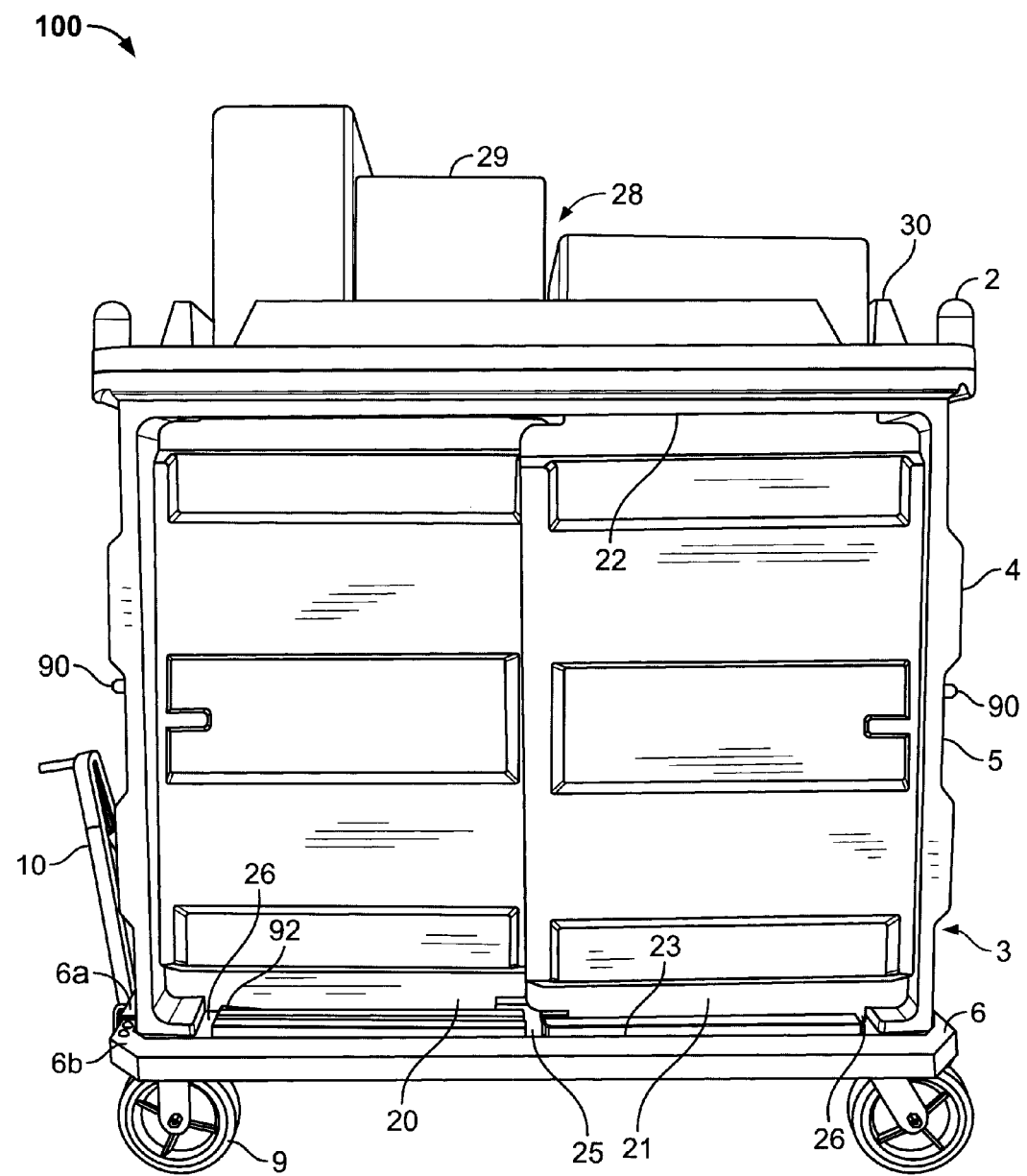
FIG. 6 is a perspective front view of the insulated food tray transportation wagon as shown in FIG. 1 with food items located in the upper area with both panels closed.
Figure 7:
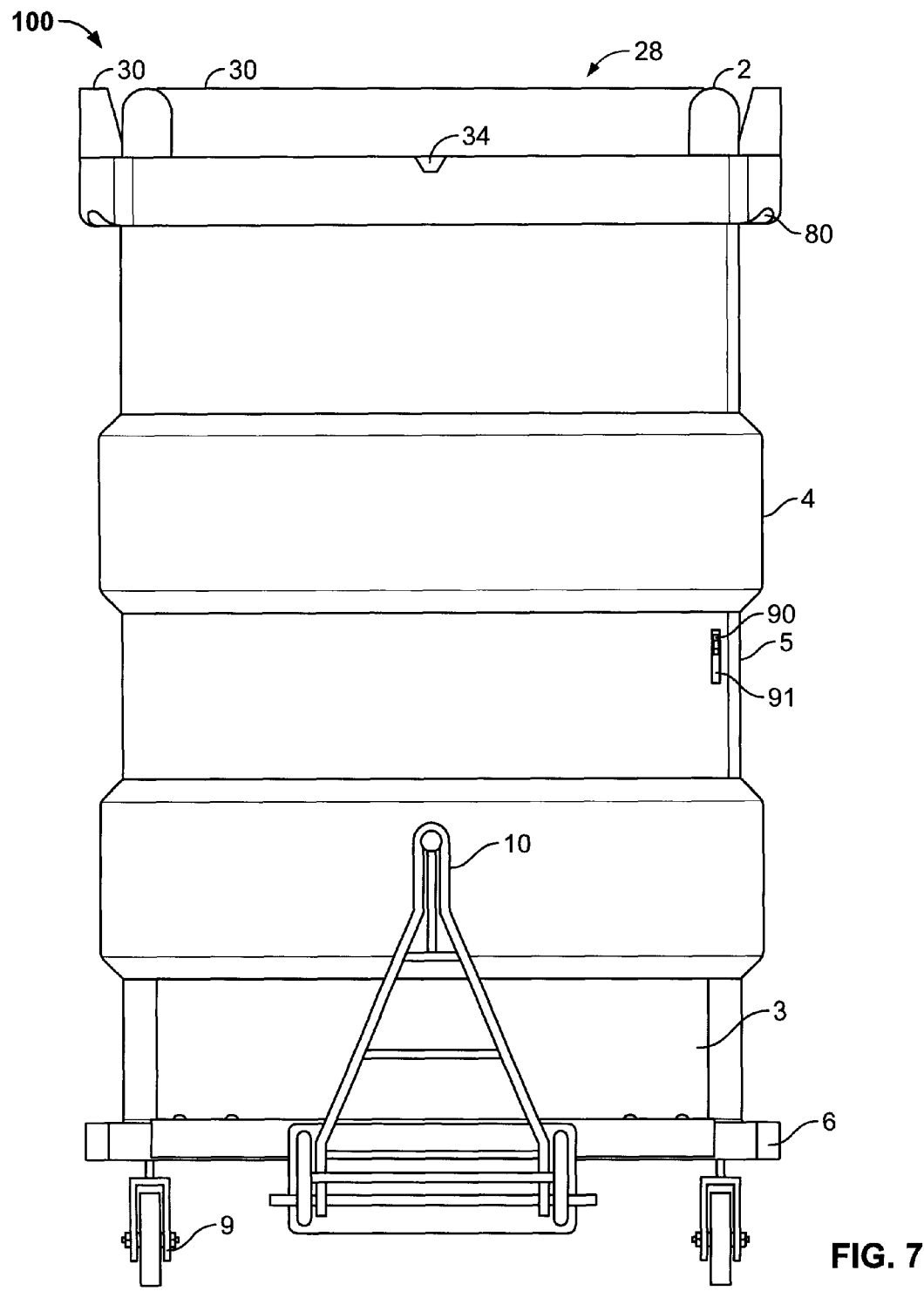
FIG. 7 is a left side view of the insulated food tray transportation wagon as shown in FIG. 1.

FIGS. 5 and 6 show perspective front views of the insulated food tray transportation wagon as shown on FIG. 1 with food items located in the upper area with one panel partly opened 20 and with both panels 20, 21 closed, respectively. Three grooves defined as the third groove 25 are placed across the first groove 18 and the second groove 19 in order to define a bottom front drain. In one embodiment, the bottom end 23 of the first and second panels 20, 21 further include a lock tab 26 that blocks the third groove 25 in either the open or the closed position. This lock tab 26 allows for the retention of fluids inside of the enclosed volume 10 during storage and transportation stages when both panels 20, 21 are in the closed configuration as shown in FIG. 6. The third groove 25 may be made in the cuboid-shaped internal surface 12 and may include a floor surface 16 having at least the third groove, the third groove defining a bottom drain. In yet another embodiment, the first groove 18 and the second groove 19 each comprise a third groove 25 for further defining the bottom drain. In yet another embodiment, a small opening is made in the floor surface 16 within the internal surface 12 and the external surface 5 in order to define an internal drain (not shown). It is understood by one of ordinary skill in the art that the internal drain (not shown) can be placed at any location, can be made part of the molding, or can be machined afterwards. What is contemplated in the present disclosure is any reasonable method of creating an internal drain, including but not limited to the use of an insert and a plug to control the flow of foods and liquids through the internal drain.

Figure 3:
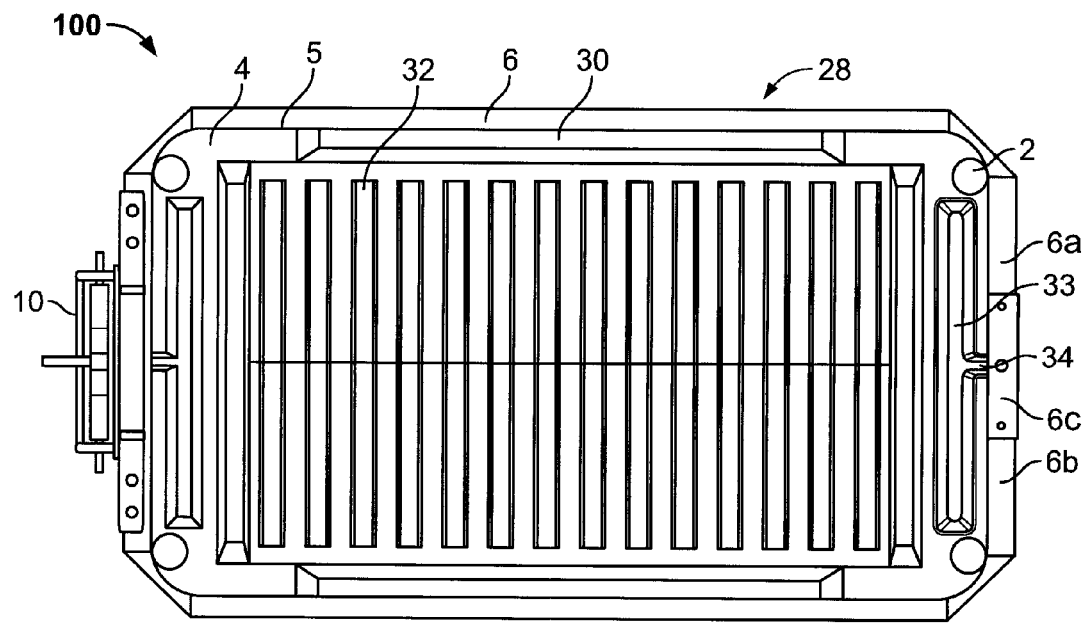
FIG. 3 is a top view of the insulated food tray transportation wagon as shown in FIG. 1.

FIG. 3 is a top view of the insulated food tray transportation wagon as shown in FIG. 1 where the external surface 5 comprises an upper area 28 for holding items as shown in FIGS. 5-6. In one preferred embodiment, the upper area 28 is ribbed to hold either more trays, beverage servers, wash racks, food items, or other items 29. In another embodiment, the ribs are designed to promote fluid evacuation by using height variations. In one embodiment, four lateral extrusions 30 for the lateral retention of the at least one food item 29 are placed on the external surface 5 within the area created by the four handles 2 to maintain access to the handles 2 if food items or other items 29 are placed on the upper area 28.

FIG. 1 shows small ribs 32 placed on the upper area 28 in order to offer more stability to the food items in case of shocks during movement of the wagon 100. FIG. 1 also shows two storage zones 33, each equipped with a drain notch 34 placed at each end of the wagon 100 on the upper area 28. The use of grooves, notches, drains, and zones made within the external surface 5 in any variety of geometries reduces the weight of the wagon 100 and provides additional storage and grasping areas. In one embodiment, the upper area 28 comprises ridges that may be used to define a top drain (not shown) and guide liquids off the upper area 28. In yet another embodiment, a bottom ridge 80 is placed on the under portion of the upper area 28 to facilitate manual grasping of the upper area 28.

In another embodiment, the food tray transportation wagon 100 forms, in addition to a simple enclosed volume, also serves as an insulated transportation device for food trays where the first panel 20 serves as first insulated panel (also numbered 20 for simplicity), the second panel 21 serves as a second insulated panel (also numbered 21 for simplicity), where the insulated panels have a top thermal sealing end 32 located at the top end 22 and a bottom thermal sealing end 33 located at the bottom end 33, and where the inside volume 10 is insulated from an exterior volume by a thermal barrier comprising the dual-surface, molded shell 4 filled with insulating foam (not shown), the first insulated panel 20 and the second insulated panel 21, where the top sealing end 32 and the bottom sealing end 33 are thermally connected to the first groove 18 for the first insulated panel 20, and the upper sealing end 32 and the lower sealing end 33 are thermally connected to the second groove 19 for the second insulated panel 21. What is also disclosed is the use of two consecutive layers of thermal insulation consisting of insulated food trays 101 placed within an insulated wagon 100.

The wagon 100 is also designed to withstand vertical loads to prevent permanent deformation if at least one large human stands on the top of the wagon 100. Extensive resistance testing was conducted with the help of William Perry, a.k.a. the Refrigerator, as a sample human. In one preferred embodiment, blue and gray have been selected as available suitable exterior colors, but what is contemplated is the use of any color or color combination. In another embodiment, what is contemplated is the use of a steel hasp used in addition to the friction-based locking mechanism when long-term storage is contemplated. In one commercial embodiment, the wagon 100 has external dimensions of approximately 32 inches wide by approximately 58 inches long and approximately 65 inches high with an overall weight of approximately 215 pounds without trays.

It is understood by one of ordinary skill in the art that these elements and devices correspond to the general elements to be used to practice this disclosure. Other auxiliary elements may be used, but they do not affect the validity and completeness of this general concept of the disclosure. Persons of ordinary skill in the art appreciate that although the teachings of the disclosure have been illustrated in connection with certain embodiments, there is no intent to limit the invention to such embodiments. On the contrary, the intention of this application is to cover all modifications and embodiments falling fairly within the scope of the teachings of the disclosure.

What is claimed is:

1. A wagon for the transportation of food trays comprising:
   a dual-surface, molded shell comprising a cuboid-shaped internal surface having a first rectangular opening, an external surface having a second rectangular opening, and a junction surface connecting the first rectangular opening to the second rectangular opening to form an enclosed volume having an internal surface, the junction surface comprising a first groove at a fixed distance from the first rectangular opening for holding a first panel, and a second groove at a fixed distance from first groove for holding a second panel;
   an insulating foam in the enclosed volume in contact with the internal surface; and
   a frame having at least three wheels connected to an outer ring of the external surface, wherein the frame is a closed metallic structure of U-shaped segments above the outer ring with a series of gaps and openings for evacuation of waste from the enclosed volume, and wherein the frame is of a greater radial size than the outer ring of the external surface to create a built-in shock absorber system;
   wherein the first panel is slidably connected in the first groove for sliding from an open position to a closed position, and wherein the second panel is slidably connected in the second groove for sliding from an open position to a close position, and
   wherein the sliding movement of the first panel within the first groove requires an outside force to overcome the frictional force between the first groove and the first panel.

2. The wagon for the transportation of food trays of claim 1, wherein the first panel further comprises a top end and a bottom end, and wherein the frictional force is a result of the contact of the top end and the bottom end with the first groove.

3. The wagon for the transportation of food trays of claim 2, wherein the cuboid-shaped internal surface comprises a floor surface having at least a third groove, the third groove defining a bottom drain.

4. The wagon for the transportation of food trays of claim 2, wherein the wagon further comprises a series of bottom drains made from an opening in the internal surface and in the external surface.

5. The wagon for the transportation of food trays of claim 3, wherein the first groove and the second groove each comprise a third groove for further defining the bottom drain.

6. The wagon for the transportation of food trays of claim 5, wherein the bottom end of the first panel comprises a recess for further defining the bottom drain.

7. The wagon for the transportation of food trays of claim 1, wherein the frame has four wheels connected to the external surface.

8. The wagon for the transportation of food trays of claim 1, wherein the dual-surface, molded shell is made of a blend of a flame-retardant, high-density polyethylene and a low-density copolymer.

9. The wagon for the transportation of food trays of claim 8, wherein the dual-surface, molded shell is a custom compounded polyaxis including a copolymer consisting of halogenated bisphenol derivative, antimony, and titanium dioxide.

10. The wagon for the transportation of food trays of claim 1, wherein the external surface comprises a kick plate.

11. The wagon for the transportation of food trays of claim 1, wherein the external surface comprises a upper area acting for holding at least a food item.

12. The wagon for the transportation of food trays of claim 11, wherein the upper area comprises ridges for defining a top drain.

13. The wagon for the transportation of food trays of claim 12, wherein the upper area further comprises lateral extrusions for the lateral retention of the at least one food item.

14. The wagon for the transportation of food trays of claim 11, wherein the external surface comprises at least two top handles and a kick plate secured to a base for maneuvering the wagon.

15. The wagon for the transportation of food trays of claim 1, wherein the external surface comprises a hitch for attaching the wagon to a second wagon.

16. The wagon for the transportation of food trays of claim 1, wherein the external surface comprises a hitch for attaching the wagon to a vehicle.

17. The wagon for the transportation of food trays of claim 1, wherein the insulating foam is a mixture of Resin and Isocyanate.

18. A food tray transportation wagon comprising:
    a shell comprising a cuboid-shaped internal surface having a first rectangular opening, an external surface having a second rectangular opening, and a junction surface connecting the first rectangular opening to the second rectangular opening to form an enclosed volume having an internal surface;
    an insulating foam in the enclosed volume in contact with the internal surface; and
    a frame having at least three wheels connected to an outer ring of the external surface, wherein the frame is a closed metallic structure of U-shaped segments above the outer ring with a series of gaps and openings for evacuation of waste from the enclosed volume, and wherein the frame is of a greater radial size than the outer ring of the external surface to create a built-in shock absorber system;
    wherein the shell is made of a blend of a flame-retardant, high-density polyethylene and a low-density copolymer.

19. The food tray transportation wagon of claim 18, wherein the frame has four wheels connected to the external surface.

20. The food tray transportation wagon of claim 18, wherein the cuboid-shaped internal surface comprises a floor surface having at least a groove defining a bottom drain.

21. The food tray transportation wagon of claim 18, wherein the external surface comprises a kick plate.

22. The food tray transportation wagon of claim 18, wherein the external surface comprises a upper area acting for holding at least a food item.

23. The food tray transportation wagon of claim 22, wherein the upper area comprises ridges for defining a top drain.

24. The food tray transportation wagon of claim 23, wherein the upper area further comprises lateral extrusions for the lateral retention of the at least one food item.

25. The food tray transportation wagon of claim 24, wherein the external surface comprises at least two extruded top handles made in the external surface and a kick plate secured to a base for maneuvering the wagon.

26. The wagon for the transportation of food trays of claim 18, wherein the external surface comprises a hitch for attaching the wagon to a second wagon.

27. The wagon for the transportation of food trays of claim 18, wherein the external surface comprises a hitch for attaching the wagon to a vehicle.

* * * * *